(12) United States Patent
Gill

(10) Patent No.: US 11,982,856 B2
(45) Date of Patent: May 14, 2024

(54) CABLE OVERBLOWING CONNECTOR

(71) Applicant: Eden Ltd, Middlesex (GB)

(72) Inventor: Paramjit Kaur Gill, Isleworth (GB)

(73) Assignee: Eden Ltd, Middlesex (GB)

( * ) Notice: Subject to any disclaimer, the term of this patent is extended or adjusted under 35 U.S.C. 154(b) by 0 days.

(21) Appl. No.: 17/748,092

(22) Filed: May 19, 2022

(65) Prior Publication Data

US 2023/0400657 A1    Dec. 14, 2023

(51) Int. Cl.
  *G02B 6/44* (2006.01)
  *G02B 6/50* (2006.01)
  *G02B 6/52* (2006.01)

(52) U.S. Cl.
  CPC .............. *G02B 6/4472* (2013.01); *G02B 6/50* (2013.01); *G02B 6/52* (2013.01)

(58) Field of Classification Search
  CPC .......... G02B 6/4472; G02B 6/50; G02B 6/52
  See application file for complete search history.

(56) References Cited

U.S. PATENT DOCUMENTS

| | | | | |
|---|---|---|---|---|
| 5,781,678 A | * | 7/1998 | Sano | G02B 6/4472 226/7 |
| 5,915,055 A | * | 6/1999 | Bennett | G02B 6/2551 385/100 |
| 6,619,697 B2 | * | 9/2003 | Griffioen | F16L 41/023 285/133.4 |
| 6,816,663 B2 | * | 11/2004 | Daoud | G02B 6/4471 385/136 |
| 8,842,961 B2 | * | 9/2014 | Thackston | G02B 6/4471 385/137 |
| 10,725,261 B2 | * | 7/2020 | Kobayashi | G02B 6/443 |
| 2002/0079697 A1 | * | 6/2002 | Griffioen | G02B 6/4476 285/133.11 |
| 2012/0014651 A1 | * | 1/2012 | Nad | G02B 6/4472 385/109 |
| 2015/0003790 A1 | * | 1/2015 | Wu | G02B 6/3888 385/81 |
| 2021/0286134 A1 | * | 9/2021 | Taira | G02B 6/3879 |

FOREIGN PATENT DOCUMENTS

| | | | |
|---|---|---|---|
| EP | 3637165 A1 | 4/2020 | |
| GB | 2552394 A | 1/2018 | |

* cited by examiner

*Primary Examiner* — Ryan A Lepisto
(74) *Attorney, Agent, or Firm* — Jose Cherson Weissbrot

(57) ABSTRACT

A connector assembly comprising: a first end and a second end; a first inlet for receiving a protective duct of an enhanced performance fibre unit; a second inlet for receiving a protective duct of an enhanced performance fibre unit; an outlet for receiving a protective duct of an enhanced performance fibre unit; a first internal channel between the first inlet and the outlet for receiving a length of enhanced performance fibre unit stripped of its protective duct; and a second internal channel for receiving a length of enhanced performance fibre unit stripped of its protective duct between the second inlet and a section of the first internal channel proximate the outlet.

3 Claims, 3 Drawing Sheets

CABLE OVERBLOWING CONNECTOR

BACKGROUND OF THE INVENTION

The legacy external telecommunication network was constructed decades ago and has, until recently, been thought to be full. This is because the installed cable diameter was the largest that could be installed successfully and consistently with the methods available at the time.

It is now known that pneumatic 'over-blowing' can be employed to add micro-cables to the network. This is a popular technique used around the world, and has led to significant savings, both of time and money, in the deployment of new cables.

Specialist equipment has been and is still being developed for pneumatic overblowing. When said specialist equipment has been used for an installation project, it is disassembled ready for a future deployment, and the integrity of the network is restored using further specialised consumables. These consumables must comply with certain performance requirements.

Blown fibre units and micro cables in protective micro ducts were successfully rolled out about thirty years ago. This legacy network has the potential to be exploited with additional capacity by employing the technique described above. This will require products which are easy to use and cost effective, since the network is vast. They will need to maintain the integrity of the existing network.

Past and current bad practice is evident throughout the existing network, leaving a great deal of fibre units exposed and extremely vulnerable. A solution is needed to eliminate bad practice so that the problem does not continue to get worse.

The invention to at least partially meet these needs.

STATEMENT OF INVENTION

A first aspect of the invention provides a connector assembly comprising: a first end and a second end; a first inlet for receiving a protective duct of an enhanced performance fibre unit; a second inlet for receiving a protective duct of an enhanced performance fibre unit; an outlet for receiving a protective duct of an enhanced performance fibre unit; a first internal channel between the first inlet and the outlet for receiving a length of enhanced performance fibre unit stripped of its protective duct; and a second internal channel for receiving a length of enhanced performance fibre unit stripped of its protective duct between the second inlet and a section of the first internal channel proximate the outlet.

The first inlet and the second inlet may be disposed at the first end and the outlet may be disposed at the second end.

The connector assembly further comprises: a first half having a first end and a second end and defining: a first lengthwise half of the first channel; a first lengthwise half of the second channel; a first lengthwise half of the first inlet; and a first lengthwise half of the outlet; the connector assembly further comprising a second half having a first end and a second end and defining: a second lengthwise half of the first channel; a second lengthwise half of the second channel; a second lengthwise half of the first inlet; and a second lengthwise half of the outlet; the first half and the second half being connectable together to form the connector assembly.

The first half and the second half may be hingedly connectable about their respective first ends by means of a hook protruding from the first end of the first half and a lateral bar supported by a protrusion from the first end of the second half.

The first half and the second half are fixedly connectable about their respective second ends by means of a clip.

The clip may comprise: a base; and two pins protruding from the base; wherein the base: is configured to abut in use the second ends of the first half and second half of the connector assembly; and is shaped to fit around the outlet of the connector assembly.

BRIEF DESCRIPTION OF THE DRAWINGS

The invention will be described, by way of example only, with reference to the following drawings.

DETAILED DESCRIPTION OF THE DRAWINGS

The invention provides a connector for adding a new branch to an already existing enhanced performance fibre unit (EPFU). The duct protecting the EPFU is cut, without damaging the fibre inside, and a length of the duct is removed. The exposed legacy EPFU is then positioned in a first channel within the connector, from an inlet of the first channel to an outlet. The new branch duct is then added to the inlet of a second channel. The second channel and the first channel meet just before the outlet of the first channel, such that they share an outlet. The connector is then sealed, and an airblock is applied within the legacy duct at the inlet side. A new fibre unit can then be overblown through the new branch duct, through the connector, and into the legacy duct at the outlet.

Figure 1:
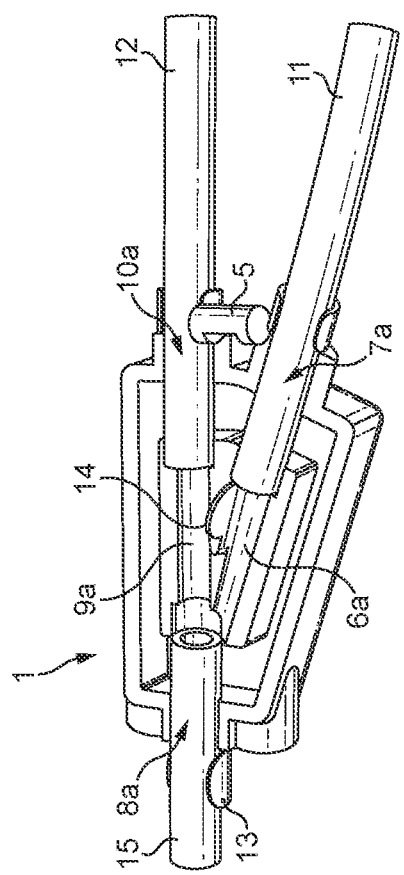
FIG. 1 depicts a device according to the invention separated into parts.
Figure 1:
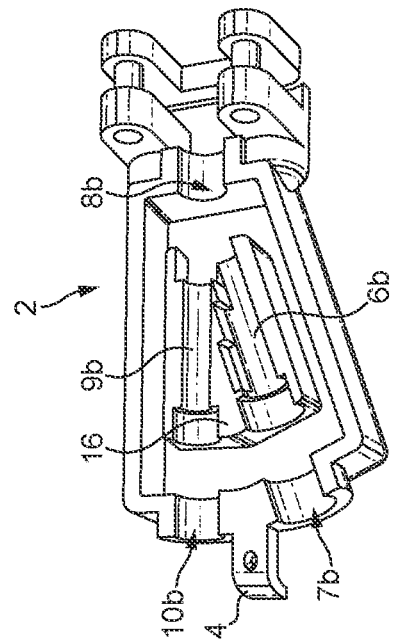

FIG. 1 depicts an exemplary connector according to the invention. The connector is formed of two main parts, 1, 2, and a clip 3. The main parts 1, 2 each have an inner face and an outer face, and a proximal end and a distal end.

In use, the first main part 1 is hingedly coupled to the second main part 2 by means of a hook 4 at the proximal end of the second main part 2, and a corresponding bar 5 at the proximal end of the first main part 1. The inner faces of the two main parts 1, 2 are then brought together, and the clip 3 is inserted at the distal end, so that the two main parts 1, 2 are held together.

A first channel 6a is defined in the inner face of the first main part 1, from a first inlet 7a at the proximal end towards an outlet 8a at the distal end.

A second channel 9a is defined in the inner face of the first main part 1, from a second inlet 10a at the proximal end towards the outlet 8a.

The axis of the outlet 8a is substantially aligned with the axis of the second channel 9a. The axis of the first channel 6a is offset by an angle greater than zero degrees and less than ninety degrees from the axes of the outlet 8a and the second channel 9a.

The first channel 6a has a proximal end, proximate the first inlet 7a, and a distal end, proximate the outlet 8a. Similarly, the second channel 9a has a proximal end, proximate the second inlet 10a, and a distal end, proximate the outlet 8a.

The first channel 6a is wider at its proximal end than in its central section. The second channel 9a is wider at its proximal end, and at its distal end, than at its central section.

The first channel 6a merges into the second channel 9a proximate the distal end.

In use, a length of legacy EDFU is received by the connector, running from the first inlet 7a, through the first channel 6a, through the merged distal section of the second channel 9a, and through the outlet 8a. A length of the protective duct is removed, and the un-ducted length of legacy EDFU runs along the narrower section of the first channel 6a.

Because of the angular offset between the axes of the first channel 6a, and the aligned distal end of the second channel 9a and outlet 8a, the un-ducted fibreoptic cable running through the narrow section of the first channel 6a will, when it re-enters the ducted portion proximate the distal end of the second channel 9a and the outlet 8a, be held substantially to the side of the duct corresponding to the side of the first channel 6a, leaving a portion of the entrance to the duct unobstructed by the fibreoptic cable.

In use, a new length of duct through which a new length of fibreoptic cable to be added to the network will be blown, is received by the second inlet 10a and the wider section of the proximal end of the second channel 9a. When the new cable is blown through the new length of duct, it will be guided by the second channel 9a into the legacy duct held by the outlet 8a. In this way, overblowing new cable into the legacy duct is made very straightforward, and the joint is held securely by the connector.

In order for the overblowing procedure to work more efficiently, the interior passage of the legacy duct at the inlet 7a side should be made substantially gas tight. In this way, substantially all of the gas used to overblow the new fibreoptic cable will pass from the second inlet 10a to the outlet 8a and through the legacy duct to be overblown, and gas pressure will not be lost through the inlet end of the legacy duct.

A first pair of lugs 11 protrudes from the sides of the first inlet 7a. A second pair of lugs 12 protrudes from the sides of the second inlet 10a. A third set of lugs 13 protrudes from the sides of the outlet 8a. In use, the lugs frictionally engage with the lengths of duct which pass through the inlets 7a, 10a and outlet 8a and hold them in place during installation.

An upstand 14 protrudes from inside the first main part 1, running alongside the narrow section of the first channel 6a, between the first channel 6a and the second channel 9a. In use, this serves as a guide to prevent the legacy fibreoptic cable entering the second channel 9a before the distal end merging, during installation.

The perimeter of the inside of the first main part 1 comprises a sealing cavity 15. This is filled with a sealing material (not shown) such as rubber, in order to make the connector substantially airtight once the two main parts 1, 2 are fixed together, as will be described below.

The second main part 2 has a first channel 6b, a first inlet 7b, an outlet 8b, a second channel 9b, and a second inlet 10b. These features correspond to the features of the same name and numeral in the first main part 1 as described above. When the main parts 1, 2 are connected together, the corresponding channels 6, 9, inlets 7, 10 and outlets 8 come together to form passageways of substantially circular cross-section.

There is a recess 16 alongside the edge of the first channel 6b, between the first channel 6b and the second channel 8b. This receives the upstand 14 of the first main part 1 when the two main parts 1, 2 are put together.

As described above, the two main parts are held together at the inlet end by a hook 4 and bar 5, and by a clip 3 at the outlet end. The clip of the depicted embodiment will now be described in more detail, with reference to FIGS. 2 and 3.

Figure 2:
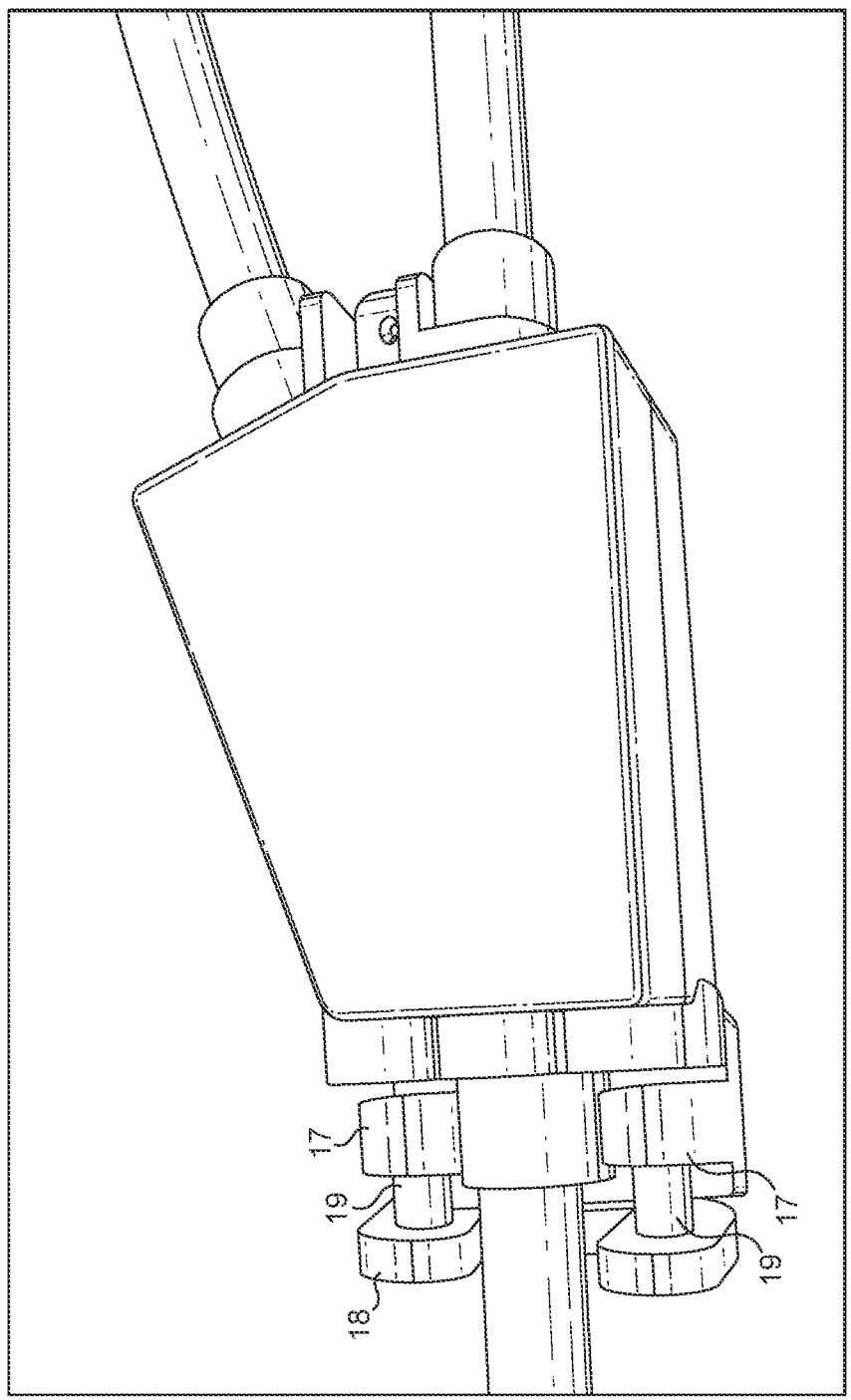
FIG. 2 depicts a device according to the invention, assembled and from first perspective.

FIG. 2 depicts a view of the outer face of the first main part 1 of a connector according to an embodiment of the invention, with the two main parts 1 and 2 connected together, and the clip 3 partially inserted at the distal end.

As is clear from the image, the first main part 1 is shorter than the second main part. Protruding from the distal end of the inner face of the second main part 2 are two clip-receiving protrusions 17. These are arranged so that the outlet 8a of the first main part 1 will fit between them when the two main parts 1, 2 are connected together, and so that the distal edge of the first main part on either side of the outlet 8 will be substantially flush with the proximal faces of the clip-receiving protrusions 17.

A hole passes through each clip-receiving protrusion 17, from the proximal to the distal faces. A corresponding pair of holes is formed in the distal edge of the first main part 1. When the two main parts 1, 2, are connected, each hole through the clip-receiving protrusions 17 aligns with a respective corresponding hole in the distal edge of the first main part 1.

The clip comprises a base 18 and a pair of pins 19. The pins 19 protrude substantially perpendicularly from the plane of the base 18. The base 18 is shaped so as to define a central recess, to accommodate in use the outlet 8 and distal duct. In other words, the base forms c shape. Each pin 19 protrudes from a respective end of the c shape.

In use, when the inner faces of the main parts 1, 2 are brought together, with the hook 3 and bar 4 hingedly coupled, the pins 19 are inserted through the holes in the clip-receiving protrusions 17 and the corresponding holes in the distal edge of the first main part 1. The pins can be held in place by any conventional means, perhaps by adhesive or by an integral frictional engaging catch.

Figure 3:
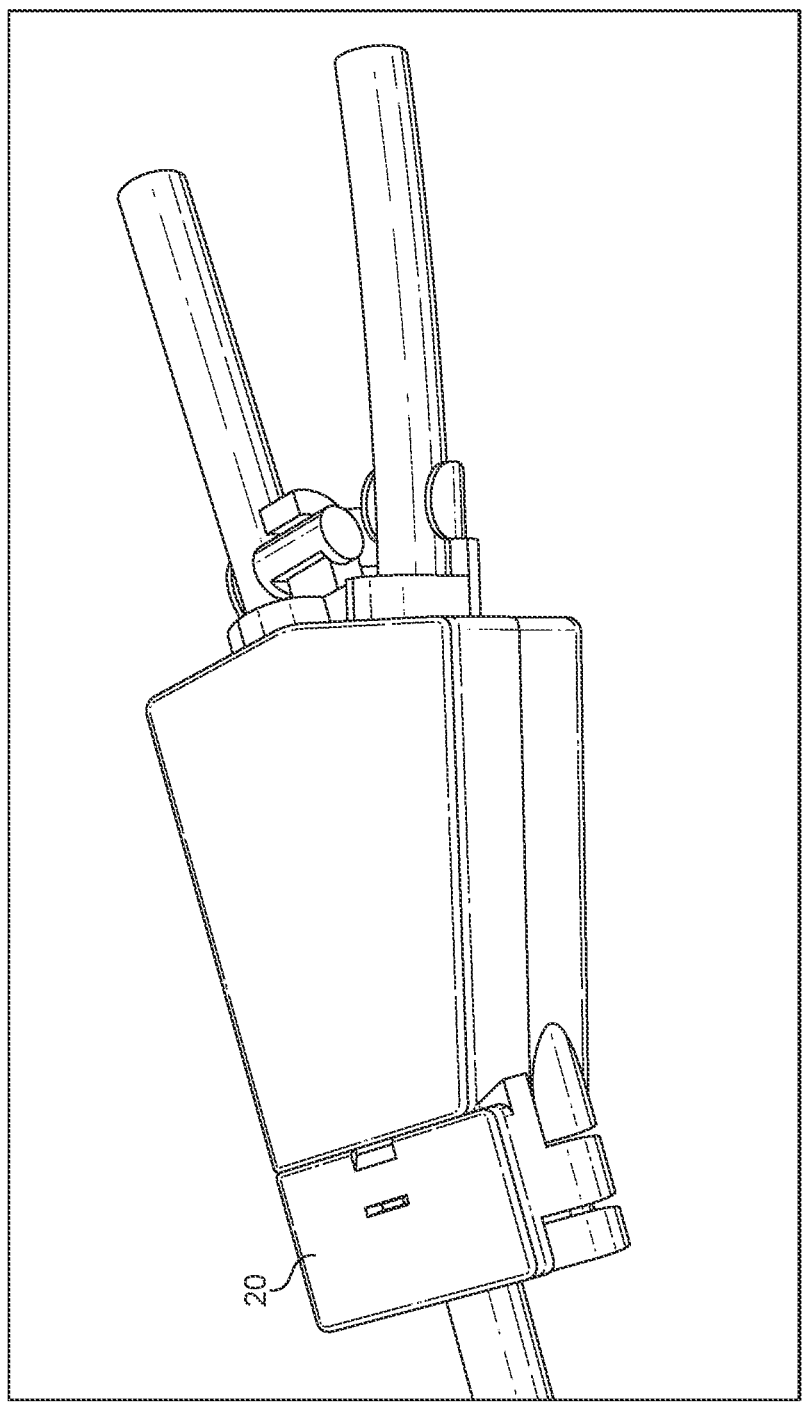
FIG. 3 depicts a device according to the invention, assembled and from a second perspective.

As can be seen in FIG. 3, the outer face of the second main part 2 has a distal extension 20 so that, in use, the distal edge of the second main part 2 is flush with the distal face of the base 18 of the clip 3.

In use, during an overblowing procedure, the connector will need to be airtight at pressures of up to 10 bar ($10^6$ Pa). It may therefore be necessary to encase the connector in an 'overblow pressure chamber' (OPC). In a preferred embodiment, the OPC comprises an aluminium box with two inlets and an outlet for the fibre units. The aluminium box is preferably in two parts, which may be hingedly connected together and held shut in use around the connector by a toggle arrangement or a clamp. When the connector is arranged in the OPC box, the ducts are arranged in the inlets and outlet supported by integral O-rings, and the OPC box is held shut, it is airtight to the necessary pressure.

The invention has been described with reference to a preferred embodiment. The embodiment described and its accompanying drawings do not limit the scope of the invention. The scope of the invention is limited by the claims.

What is claimed is:

1. A cable overblow connector assembly comprising:
    a first end and a second end;
    a first inlet for receiving a protective duct of an enhanced performance fibre unit;
    a second inlet for receiving a protective duct of an enhanced performance fibre unit;
    an outlet for receiving a protective duct of an enhanced performance fibre unit;

a first internal channel between the first inlet and the outlet for receiving a length of enhanced performance fibre unit stripped of its protective duct; and a second internal channel for receiving a length of enhanced performance fibre unit stripped of its protective duct between the second inlet and a section of the first internal channel proximate the outlet;

the connector assembly further comprising a first half having a first end and a second end and defining:

a first lengthwise half of the first channel;
a first lengthwise half of the second channel;
a first lengthwise half of the first inlet; and
a first lengthwise half of the outlet;

the connector assembly further comprising a second half having a first end and a second end and defining:

a second lengthwise half of the first channel;
a second lengthwise half of the second channel;
a second lengthwise half of the first inlet; and
a second lengthwise half of the outlet;

the first half and the second half being connectable together to form the connector assembly;

wherein
the first half and the second half are fixedly connectable about their respective second ends using a clip,
the clip comprises a base and two pins protruding from the base;
wherein the base is:
shaped to fit around the outlet of the connector assembly; and
configured to abut in use the second ends of the first half and second half of the connector assembly.

2. The cable overblow connector assembly according to claim 1, wherein the first half and the second half are hingedly connectable about their respective first ends using a hook protruding from the first end of the first half and a lateral bar supported by a protrusion from the first end of the second half.

3. The cable overblow connector assembly according to claim 1, wherein the first inlet and the second inlet are disposed at the first end and the outlet is disposed at the second end.

* * * * *